Nov. 10, 1970        J. F. WILSON        3,539,329
PROCESS FOR GRANULATING AMMONIUM SULFATE
Filed March 23, 1967        2 Sheets-Sheet 1

INVENTOR.
J. F. WILSON
BY *Young & Quigg*
ATTORNEYS

3,539,329
PROCESS FOR GRANULATING AMMONIUM SULFATE

Joseph F. Wilson, Bartlesville, Okla., assignor to Phillips Petroleum Company, a corporation of Delaware
Continuation-in-part of application Ser. No. 545,033, Apr. 25, 1966. This application Mar. 23, 1967, Ser. No. 625,466
Int. Cl. C05d 9/00
U.S. Cl. 71—61                                                    9 Claims

ABSTRACT OF THE DISCLOSURE

Ammonium sulfate prills are formed by spraying sulfuric acid onto ammonium sulfate crystals having small mesh size, tumbling or mixing the wetted ammonium sulfate crystals to effect agglomeration thereof, and ammoniating the sulfuric acid in the agglomerates to form additional ammonium sulfate as a binding material for the preformed crystals. The resulting prills are substantially one-hundred percent ammonium sulfate having a unique structure wherein relatively large (preformed) crystals are randomly distributed in a matrix of relatively small crystals (formed in situ).

---

Figure 3:
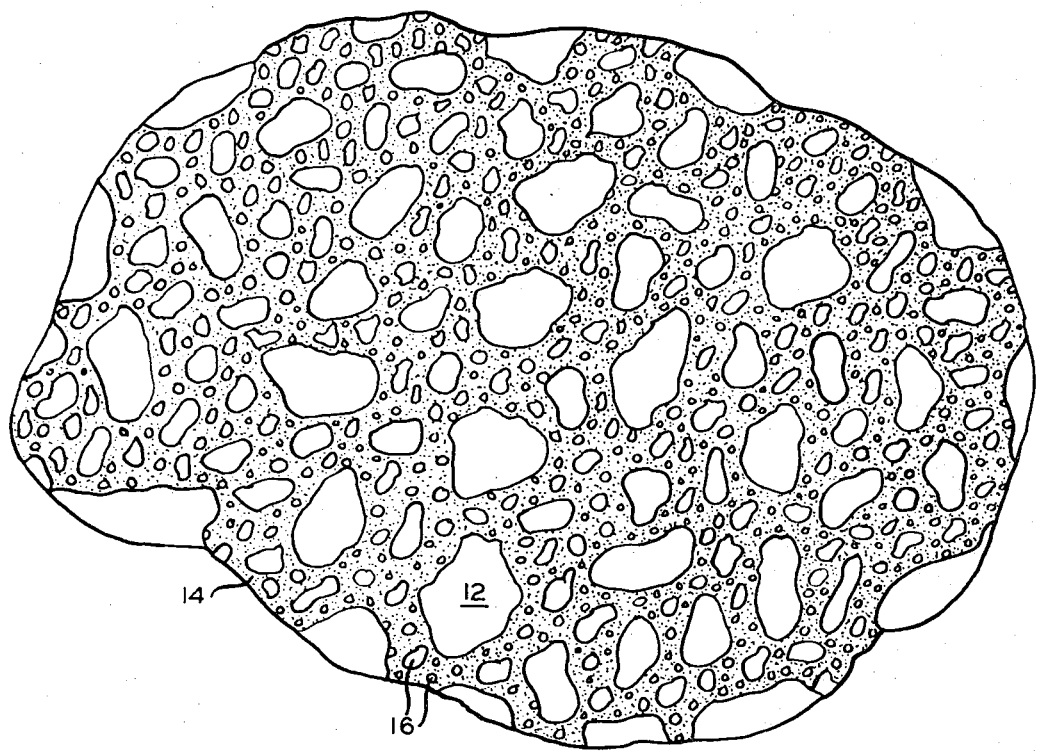

This application is a continuation-in-part of application S.N. 545,033, filed Apr. 25, 1966 and now abandoned.

This invention relates to a process for the production of substantially pure granulated or prilled ammonium sulfate having a specified particle size which is free of any organic or thermoplastic bonding impurities, and to a novel ammonium sulfate prill.

In using the term "granulation," I mean agglomerating particles of ammonium sulfate in a moist state, followed by drying and screening to obtain a selected range of particle size. Throughout the specification and claims, particle size is defined by reference to Tyler screen which is described in the "Chemical Engineers Handbook," Perry, Chilton and Kirkpatrick, 4th ed., McGraw-Hill Book Company, Inc., New York (1963), section 21, pp. 50, 51.

The problem of prilling or granulating ammonium sulfate to a specified particle size is well recognized in the fertilizer art. Ammonium sulfate unlike other salts such as ammonium nitrate and ammonium phosphate does not undergo softening prior to melting. This presents a problem in granulating ammonium sulfate for the reason that the crystals or particles of ammonium sulfate will not readily adhere to each other through the action of heat alone. Therefore, under the prior art in order to granulate ammonium sulfate it has been required to use either organic materials or some thermoplastic material as a granulating agent. These methods all result in the production of impure ammonium sulfate prills or granules.

The simple dry blending of granular fertilizers as a method of producing mixed fertilizers has increased in importance in the fertilizer industry in recent years. The most serious problem associated with the use of dry blends is that of segregation. The principal cause of segregation in dry blending is due to differences in particle size and particle shape. Only a small difference in particle size will tend to concentrate the finer material toward the center of a mass or pile mixed fertilizer. Such segregation not only causes difficulties in sampling and in meeting guaranteed analysis but also results frequently in spotty crop response in the field.

In the usual ammonium sulfate plant, top-grade sulfuric acid is reacted with aqua ammonia to produce a relatively pure ammonium sulfate product. The ammonium sulfate from such a unit has a fine crystalline needle-like shape when it is recovered by evaporating the water from the reaction mixture. These fine needle-like crystals for the most part have a particle size below 16 mesh. Such size and shape presents a problem if it is desired to bulk blend the ammonium sulfate with other fertilizers such as granulated ammonium nitrate and ammonium phosphate which are essentially −6 to +16 mesh in size. In the past this ammonium sulfate was readily granulated to form agglomerates having such sizes by granulating it in combination with the ammonium nitrate and ammonium phosphate in such equipment as TVA ammoniators to form a mixed blend fertilizer. However, with the advent of dry blending as explained herein above, it has now become desirable to form agglomerates of substantially pure ammonium sulfate having the specified particle size and also having roughly spheroidal shape.

Therefore, an object of this invention is to provide a novel process for forming prills of substantially pure ammonium sulfate having a generally speroidal shape and a small particle size such as in the range of −4 to +14 mesh.

It is another object to provide prills or agglomerates of substantially pure ammonium sulfate having a roughly spheroidal shape and a mesh size ranging from −4 to +14, said ammonium sulfate agglomerates being capable of being bulk blended with other fertilizers to obtain a mixed fertilizer which will not segregate.

Figure 2:
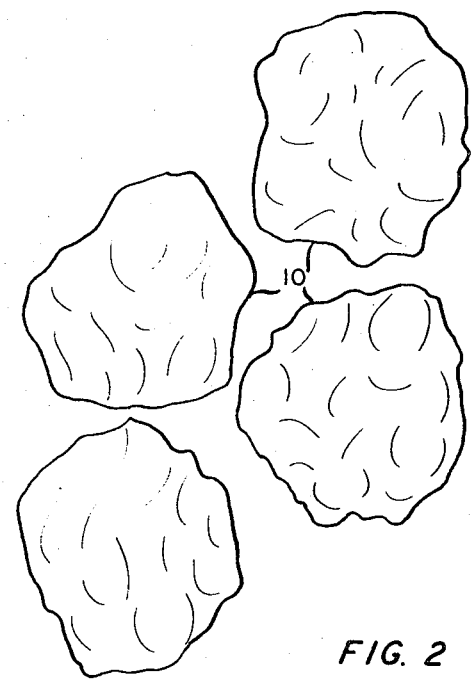
Figure 1:
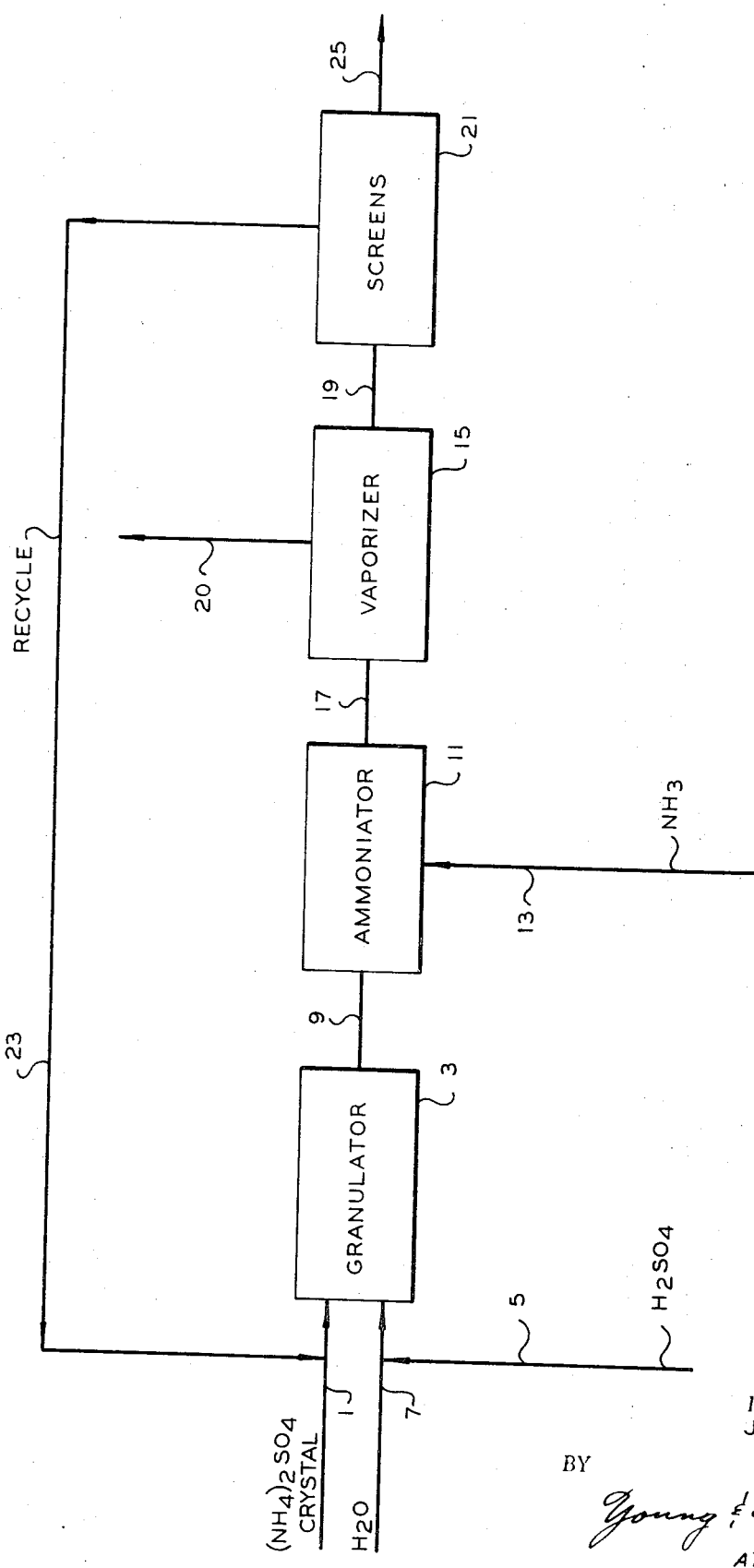

Other aspects, objects, and many of the attendant advantages of this invention will be readily appreciated as the same becomes better understood by reference to the accompanying detailed description, which is to be considered in connection with the accompanying drawing wherein:

FIG. 1 represents a flow diagram depicting the various steps in the process of the invention; FIG. 2 represents a group of enlarged prills; and FIG. 3 represents an enlarged cross section of one of the prills.

Broadly speaking, the novel process of this invention comprises the steps of first wetting a feed comprising ammonium sulfate crystals with an aqueous solution of sulfuric acid thereby forming a mixture comprising ammonium sulfate, water, and sulfuric acid; tumbling the resulting mixture in order to form agglomerates of said crystals with said acid; and thereafter ammoniating the resulting agglomerates in order to effect substantially complete neutralization of the sulfuric acid therein. It is preferred to form said mixture with the sulfuric acid concentration based on the weight of said mixture falling within the range of from 8 to 19, preferably from 10–16 weight percent and the water concentration falling within a range wherein: the lower limit of said range is defined by the expression $$W = 2.75 - \frac{T^\circ \text{ C}}{80}$$

wherein W is the minimum amount of water expressed in weight percent of said mixture required at temperature T of the feed and wherein T is maintained between 0° C. and 100° C. and the upper limit is 5 weight percent of the mixture.

It is also within the scope of the invention to recover and dry the ammonium sulfate prills to any desired water content and in addition those ammonium sulfate agglomerates which do not fall within the selected particle size may be recycled through the process.

The product of the invention is a hard, dry, very white, substantially one-hundred percent ammonium sulfate prill consisting essentially of randomly distributed relatively large crystals bound firmly together by intervening relatively small crystals.

The process of present invention is illustrated by reference to FIG. 1 which represents a preferred mode of operation. For purposes of brevity, pumps, valves, vents, and other auxiliary equipment have been omitted from the figure.

Conduit 1 designates a charge line through which ammonium sulfate crystals having a particle size of less than +16 mesh are introduced into a granulator 3. Conduit 5 designates a charge line through which sulfuric acid is introduced into the granulator. Conduit 7 provides for adding enough water to the granulator to maintain the water concentration therein within the range enumerated hereinabove.

It is also within the scope of the invention to add the sulfuric acid and water separately to granulator 3. A suitable cooling means, such as a coil or the like (not shown), may surround the granulator in order to remove the heat of solution of concentrated acid and water.

Granulator 3 is one of those commonly employed in the fertilizer trade, that is, a rotating drum or contactor, preferably one such as is ordinarily used in a fertilizer plant. A stirring type mixer may also be utilized as the agglomerator or granulator. The tumbling step preferably is carried out at a temperature in the range of 0 to 100° C. preferably 20–100° C. It is preferred to premix the water and acid and to cool the acid-water mixture to around 30° C. before charging it to the granulator.

The ammonium sulfate wetted with the aqueous sulfuric acid is then ammoniated by passing same from granulator 3 via line 9 to ammoniator 11. The ammoniation of the sulfuric acid at the surface of the ammonium sulfate agglomerates causes a release of heat which may adversely affect achieving the desired particle size, therefore it is important to maintain the temperature between 90 and 100° C. during the ammoniation step. It is also desirable to maintain a sufficient bed depth of ammonium sulfate product so as to avoid in ammoniator 11 the excessive losses of ammonia during the ammonation step. This can be achieved by providing vessel 11 with a retaining ring or the like (not shown) whereby the depth of the ammonium sulfate can be maintained at any desirable level.

The ammonia is introduced via conduit 13 into the bottom of vessel 11 to which the tumbled ammonium sulfate mixture has been passed via conduit 9. The ammonia is introduced in a gaseous state such that it passes up through the ammonium sulfate bed maintained in vessel 11 as described hereinabove. The neutralized ammonium sulfate product is passed via conduit 17 to a vaporizer 15 wherein the water present in the ammonium sulfate product is flashed and removed via conduit 20. It is also possible to achieve the drying of the ammonium sulfate product in ammoniator 11 provided a high enough temperature is achieved therein. The dried ammonium sulfate product is removed from the vaporizer via conduit 19 and passed to suitable sceening devices 21 wherein the desired particle size is separated from the product which does not conform to the desired size. Generally the desired particle size is within the ange of −4 to +14 mesh which means that the desired particles are passed through the 4 mesh screen and are retained on the 14 mesh screen. Vaporizer 15 may be a hopper and residual water may be driven off by passing dry air containing a minor concentration of ammonia upwardly through the hopper.

The ammonium sulfate particles which pass through the 14 mesh screen are recycled by way of conduit 23 or other such suitable means, such as a conveyor or belt, to granulator 3. The oversized material, that is, that which does not pass through the 4 mesh screen, is crushed and also recycled in line 23 back to granulator 3. The on-size ammonium sulfate product, that is, material having a particle size ranging from −4 to +14 mesh, is removed from the screen by way of conduit 25 as product of the process.

Granulator 3 and ammoniator 11 may be combined into one elongated cylindrical drum rotating on its horizontal axis, using a radially and inwardly projecting ring to provide a weir for overflow of granulated crystals wetted with sulfuric acid into the downstream ammoniator section of the drum. Actually, line 13 runs into the drum axially from the downstream end thereof and terminates in a sparger in the bottom of the bed of ammonium sulfate and acid granules or prills.

By operating in accordance with the process of the present invention, a yield of at least 50 percent of the ammonium sulfate originally charged is produced having a particle size in the range of −4 to +14 mesh, and a roughly spheroidal but irregular shape (that is, the actual length of the three axes $a$, $b$, and $c$ of the prills are in a ratio of approximately 1:1:1). The length of the longest axis is not greater than 50 percent larger than the length of the shortest axis.

The operability and the improved results obtained by the present invention are illustrated by reference to the following specific example which clearly shows the necessity for maintaining the critical limitations on the concentrations of sulfuric acid and water in order to obtain the described product. It is to be understood that this example does not limit the invention to any type of equipment or method by which the mixture of ammonium sulfate, sulfuric acid, and water are contacted or brought together.

EXAMPLE

A series of runs was carried out in which ammonium sulfate crystals of −14 mesh, concentrated sulfuric acid, and water in various ratios were mixed together, tumbled, and subsequently neutralized. The temperature of the amminium sulfate feed was 20° C.

In these runs, the designated amount of ammonium sulfate crystals was wetted with the designated amounts of sulfuric acid and water after which the resulting mixture was tumbled in a rotary tumber for 2 minutes. At the end of the 2-minute time, gaseous ammonia was introduced into the bottom of the 2-inch deep bed of granules to effect neutralization. The heat of reaction between the ammonia and sulfuric acid caused the bed temperature to reach 99–100° C. within 1 to 2 minutes and was accompanied by water loss in the form of steam. For this reason, subsequent drying of the ammonium sulfate product was not necessary and it was removed from the rotary tumbler and screened with Tyler standard screens to determine its particle size.

The ammonium sulfate feed used in these runs was a commercial product which had the following screen analysis:

SCREEN ANALYSIS

| Tyler mesh size: | Wt. percent |
|---|---|
| −14 +16 | 3.3 |
| −16 +20 | 13.6 |
| −20 +28 | 29.6 |
| −28 +35 | 22.0 |
| −35 | 31.5 |

The above-described ammonium sulfate crystals were employed as the feed in the 21 runs of Table I.

TABLE I

| Run No. | Feed composition, wt. percent | | | Granulated product screen analysis (Tyler mesh), wt. percent | | |
|---|---|---|---|---|---|---|
| | AS[1] | H²SO⁴ | H²O | +4 | −4+14 | −14 |
| 1 | 96.2 | 0 | 3.8 | 0 | 5.3 | 94.7 |
| 2 | 92.6 | 3.6 | 3.8 | 0 | 18.8 | 81.2 |
| 3 | 89.3 | 7.0 | 3.7 | 0 | 19.1 | 80.9 |
| 4 | 86.2 | 10.1 | 3.7 | 0.8 | 66.3 | 32.9 |
| 5 | 83.3 | 13.1 | 3.6 | 3.0 | 75.4 | 21.6 |
| 6 | 80.7 | 15.8 | 3.5 | 8.1 | 86.0 | 5.9 |
| 7 | 78.1 | 18.4 | 3.5 | 25.1 | 62.5 | 12.4 |
| 8 | 75.7 | 20.8 | 3.5 | 37.9 | 36.8 | 25.3 |
| 9 | 86.2 | 13.5 | 0.3 | 0 | 8.5 | 91.5 |
| 10 | 85.1 | 13.3 | 1.6 | 0 | 44.3 | 55.7 |
| 11 | 83.8 | 13.2 | 3.0 | 1.5 | 82.2 | 16.3 |
| 12 | 82.8 | 13.0 | 4.2 | 2.7 | 78.5 | 18.8 |
| 13 | 81.7 | 12.8 | 5.5 | 5.6 | 46.2 | 48.2 |
| 14 | 80.7 | 12.6 | 6.7 | 61.4 | 17.4 | 21.2 |
| 15 | 83.0 | 16.3 | 0.7 | 2.6 | 28.7 | 68.7 |
| 16 | 81.9 | 16.1 | 2.0 | 13.2 | 48.9 | 37.9 |
| 17 | 81.1 | 15.9 | 3.0 | 9.3 | 53.9 | 36.8 |
| 18 | 80.6 | 15.8 | 3.6 | 12.1 | 62.1 | 25.8 |
| 19 | 80.1 | 15.7 | 4.2 | 20.0 | 65.6 | 14.4 |
| 20 | 79.1 | 15.5 | 5.4 | 51.3 | 37.1 | 11.1 |
| 21 | 78.1 | 15.3 | 6.6 | 86.7 | 8.2 | 5.1 |

[1] AS=Ammonium sulfate.

In the first eight runs the weight percent of water was held substantially constant (varied from 3.5 to 3.8) which is within the preferred water concentration range. It will be noted that when the weight percent of the sulfuric acid was maintained within the range of 8 to 19, the major part of the resulting ammonium sulfate agglomerate had a particle size within the desired range. Increasing the acid concentration to 20.8 weight percent reduced the weight percent of desired particle size to 36.8, whereas reducing the acid concentration below 8 weight percent reduced the weight percent of desired particle size to 19.1 each of which represents a significant decrease.

Runs 9 through 14 were conducted under conditions wherein the weight percent of acid was held substantially constant (varied from 12.6 to 13.5) and the water ratio was increased from below the critical range to above the critical range. It is noted that when the water concentration was within the range of 2.5 to 5 weight percent, the weight percent of ammonium sulfate prills having the desired particle size was in the range of from 78.5 to 82.2. Significant reduction in yield was obtained when the water concentration was outside the critical range.

Runs 15 through 21 were conducted under conditions wherein the acid concentration was held substantially constant (varied from 15.3 to 16.3) and the water concentration was again increased from below the critical water concentration to above it. Again, it will be noted that when the water concentration was within the critical range, 53.9 to 65.6 weight percent of the ammonium sulfate agglomerates possessed the desired particle size.

Another series of runs was carried out to determine the effect of employing as a feed material hot ammonium sulfate instead of ammonium sulfate at room temperature (20° C.). The ammonium sulfate at 100° C. and water and 95.7 weight percent sulfuric acid at 20–22° C., each as a separate feed, were mixed by tumbling, and the resulting product was neutralized and sieved as before. Table II shows the effect of varying the concentration of water and sulfuric acid (as 100% H₂SO₄) on the amount of product having a particle size within the range of −4 to +14 mesh.

TABLE II

| Run No. | Feed composition, wt. percent | | | Granulated product screen analysis (Tyler mesh), wt. percent | | |
|---|---|---|---|---|---|---|
| | AS[1] | H₂SO₄ | H₂O | +4 | −4+14 | −14 |
| 1 | 85.6 | 13.7 | 0.7 | 10.3 | 32.4 | 57.3 |
| 2 | 85.3 | 13.7 | 1.0 | 11.7 | 38.1 | 50.2 |
| 3 | 84.9 | 13.6 | 1.5 | 14.0 | 61.3 | 24.7 |
| 4 | 84.5 | 13.5 | 2.0 | 16.6 | 66.4 | 17.0 |
| 5 | 83.4 | 13.3 | 3.3 | 25.6 | 53.8 | 20.6 |
| 6 | 81.1 | 13.0 | 5.9 | 68.1 | 25.4 | 6.5 |
| 7 | 92.6 | 3.6 | 3.8 | 3.5 | 4.9 | 91.6 |
| 8 | 89.3 | 6.8 | 3.9 | 7.5 | 11.1 | 81.4 |
| 9 | 86.2 | 9.9 | 3.9 | 9.9 | 57.7 | 32.4 |
| 10 | 83.4 | 12.7 | 3.9 | 25.2 | 49.2 | 25.6 |

[1] Ammonium sulfate.

It will be noted that introducing the ammonium sulfate into the granulator at 100° C. permitted the use of less water and a water content of 1.5 percent by weight (Run 3) gave a 61.3 percent yield of desired product.

The ammonium sulfate prills having desired particle size also were roughly spheroidal in shape and had a crushing strength sufficient to prevent the prills from being crushed during transporting and blending of this material with other granular fertilizers.

The prills produced by the process are illustrated in FIG. 2 and designated 10. They are generally or roughly spherical but somewhat irregular in outline, having a major diameter of approximately ⅛ inch and a minor diameter of at least 3/32 inch.

FIG. 3 illustrates a cross section of one of the prills 10 of FIG. 2. Numeral 12 designates a full cut through one of the preformed feed crystals. Numeral 14 designates minute or relatively small crystals formed between the preformed feed crystals during the prilling operation from sulfuric acid sprayed onto the feed crystals and ammonia dispersed into the acid agglomerated crystals in the ammoniator. Crystals 14 are formed in situ and function as binder for the larger preformed feed crystals.

Numeral 16 designates a face of a preformed feed crystal cut near the periphery thereof and represents a minor segment of the crystal. The crystal either increases or decreases in cross sectional area deeper in the prill. Thus, there is a random spacing of relatively large feed crystals in the prill and these are bonded together by relatively small crystals formed in situ during prilling or granule formation. The prills are white, hard, and dry and are substantially 100% ammonium sulfate. The small crystals of ammonium sulfate formed in situ comprise a matrix in which the large preformed crystals are imbedded, the matrix being bonded to said preformed crystals.

Obviously, modifications and variations of the present invention are possible in the light of the above teachings. It is therefore to be understood that within the scope of the appended claims the invention may be practiced otherwise than as specifically described herein.

What is claimed is:

1. A method for producing agglomerates of substantially pure ammonium sulfate wherein said agglomerates have a spheroidal shape and a particle size ranging from −4 to +14 mesh, said method comprising the steps of first wetting a feed comprising ammonium sulfate crystals having a mesh size less than 16 with an aqueous solution of sulfuric acid thereby forming a mixture comprising ammonium sulfate, sulfuric acid, and water, wherein the concentration of the sulfuric acid ranges from 8 to 19 weight percent of the said mixture and the concentration of the water falls within a range wherein:

the lower limit of said range is defined by the expression $$W = 2.75 - \frac{T°\ C}{80}$$

wherein W is the minimum amount of water expressed in weight percent of said mixture required at temperature T of the feed and wherein T is maintained between 0° C. and 100° C. and the upper limit is 5 weight percent of the mixture; tumbling the wetted ammonium sulfate crystals to effect an agglomeration of said ammonium sulfate crystals; then ammoniating the ammonium sulfate agglomerates to effect substantially complete neutralization of the sulfuric acid therein.

2. The process of claim 1 which includes recovering substantially pure spheroidal shaped ammonium sulfate agglomerates having a particle size ranging from −4 to +14 mesh.

3. The process of claim 1 which includes drying said ammonium sulfate agglomerates.

4. A process according to claim 1 wherein the temperature of the feed is 20° C., and the concentration of water is in the range of 2.5 to 5 weight percent of the mixture.

5. A process according to claim 1 wherein the temperature of the feed is 100° C. and the concentration of water is in the range of 1.5 to 5 weight percent of the mixture.

6. A process according to claim 1 including the step of maintaining the temperature during the tumbling step in a range of 0°–100° C.

7. A process according to claim 1 further including the step of premixing the sulfuric acid with water and cooling to approximately 30° C. prior to charging it to the granulator.

8. A process according to claim 1 including the step of maintaining sufficient ammonium sulfate present during the ammoniating step to prevent loss of ammonia.

9. A process according to claim 1 further including the step of heating the ammonium sulfate crystals prior to the step of wetting them with aqueous sulfuric acid.

References Cited
UNITED STATES PATENTS 3,351,455   11/1967   Burns _____ 71—63

REUBEN FRIEDMAN, Primary Examiner

C. N. HART, Assistant Examiner

U.S. Cl. X.R.

71—63